(12) United States Patent
Wong

(10) Patent No.: US 8,084,993 B1
(45) Date of Patent: Dec. 27, 2011

(54) REPLACEMENT SYSTEM FOR HEAVY BATTERY BANKS

(76) Inventor: Thomas K. Wong, San Francisco, CA (US)

( * ) Notice: Subject to any disclaimer, the term of this patent is extended or adjusted under 35 U.S.C. 154(b) by 1077 days.

(21) Appl. No.: 11/985,249

(22) Filed: Nov. 14, 2007

(51) Int. Cl.
*H02J 7/00* (2006.01)
*B60K 1/04* (2006.01)
*B65F 9/00* (2006.01)

(52) U.S. Cl. .......... 320/116; 320/109; 104/34; 414/339; 414/343

(58) Field of Classification Search .................. 320/116, 320/109; 104/34
See application file for complete search history.

(56) References Cited

U.S. PATENT DOCUMENTS

| | | |
|---|---|---|
| 1,566,089 A | 12/1925 | Harding |
| 2,626,972 A | 1/1953 | Marquardt |
| 3,122,244 A | 2/1964 | Corso |
| 3,782,750 A | 1/1974 | Peters |
| 4,120,411 A | 10/1978 | Johnson |
| 5,077,513 A | 12/1991 | Dea et al. |
| 5,360,307 A | 11/1994 | Schemm et al. |
| 5,508,597 A * | 4/1996 | Parmley, Sr. .................. 320/109 |
| 5,668,460 A * | 9/1997 | Lashlee et al. ................ 320/109 |
| 6,149,370 A | 11/2000 | DiBartolomeo |
| 6,357,070 B1 | 3/2002 | Venard et al. |
| 6,938,400 B2 | 9/2005 | Fillman et al. |
| 7,602,143 B2 * | 10/2009 | Capizzo ........................ 320/109 |
| 2007/0188137 A1 * | 8/2007 | Scheucher .................... 320/116 |
| 2007/0232154 A1 * | 10/2007 | Zhao et al. .................... 439/759 |

FOREIGN PATENT DOCUMENTS

WO    WO 02/056440 A2    7/2002

* cited by examiner

*Primary Examiner* — M'Baye Diao
(74) *Attorney, Agent, or Firm* — Thomas R. Lampe

(57) ABSTRACT

A plurality of manually maneuverable battery bank modules are formed into a train and transported by a vehicle to the site of electrically operated equipment. At the site, the modules replace modules already connected to the equipment.

20 Claims, 5 Drawing Sheets

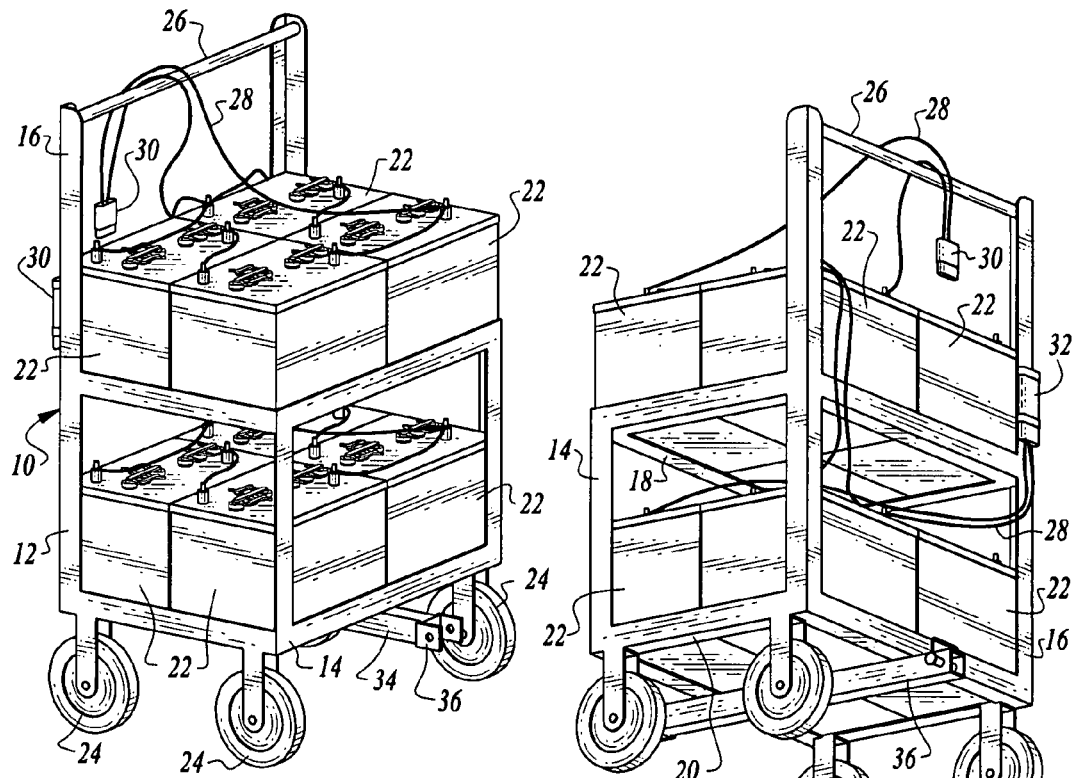
*Fig. 1*  *Fig. 2*
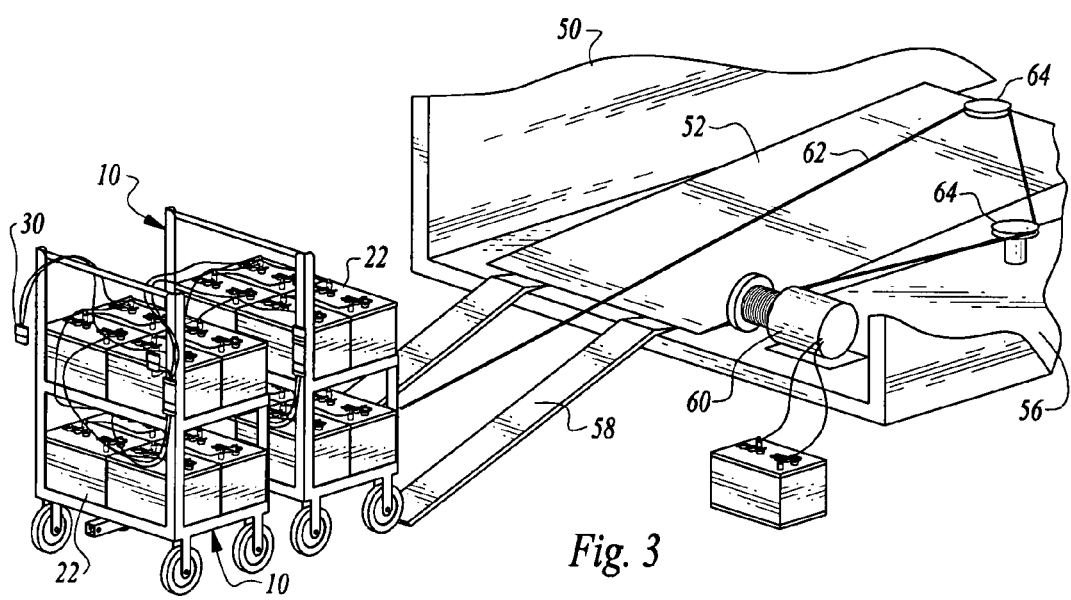
*Fig. 3*

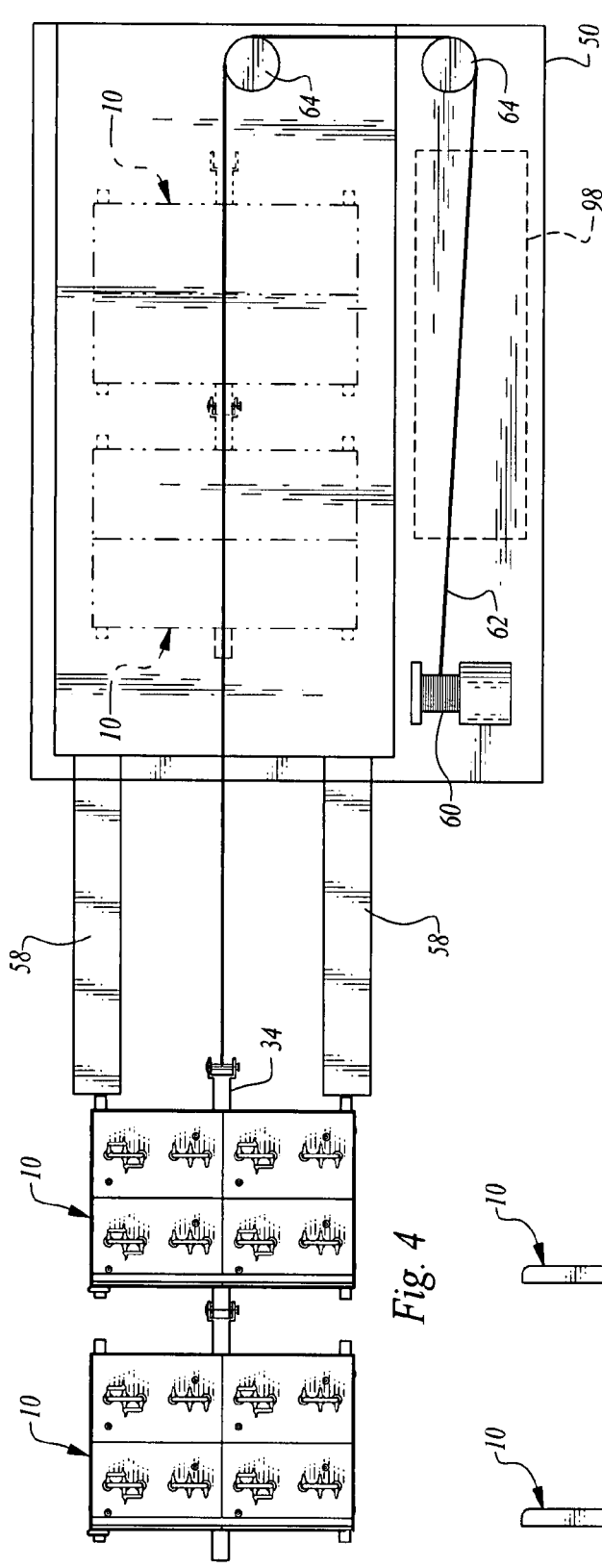
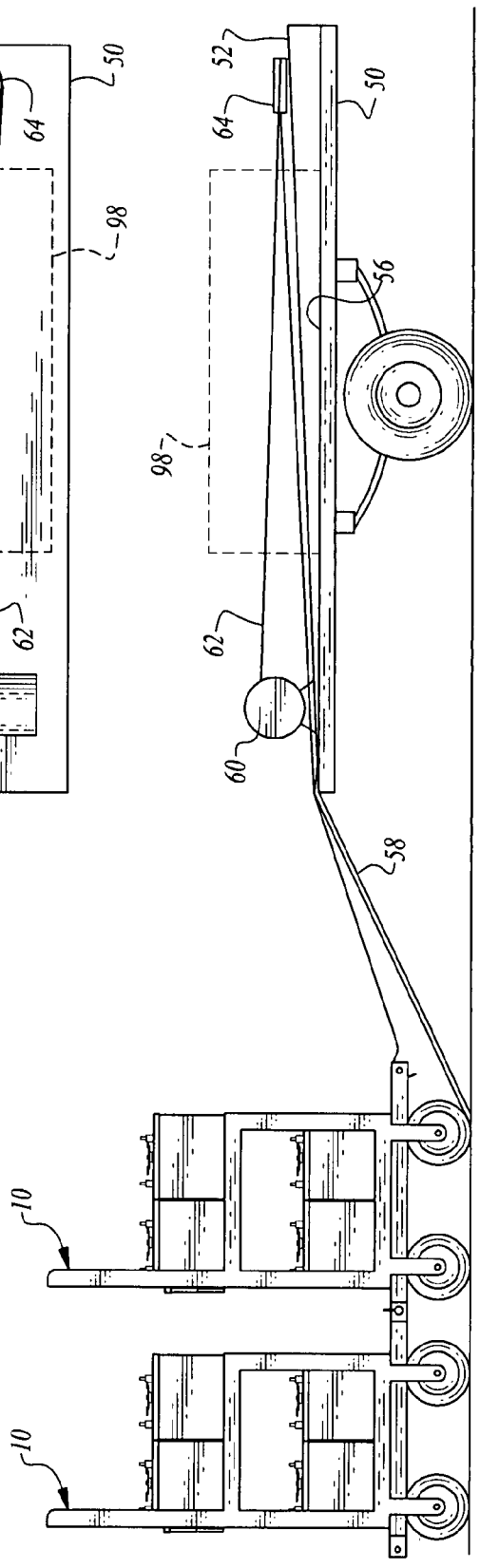
Fig. 4
Fig. 5

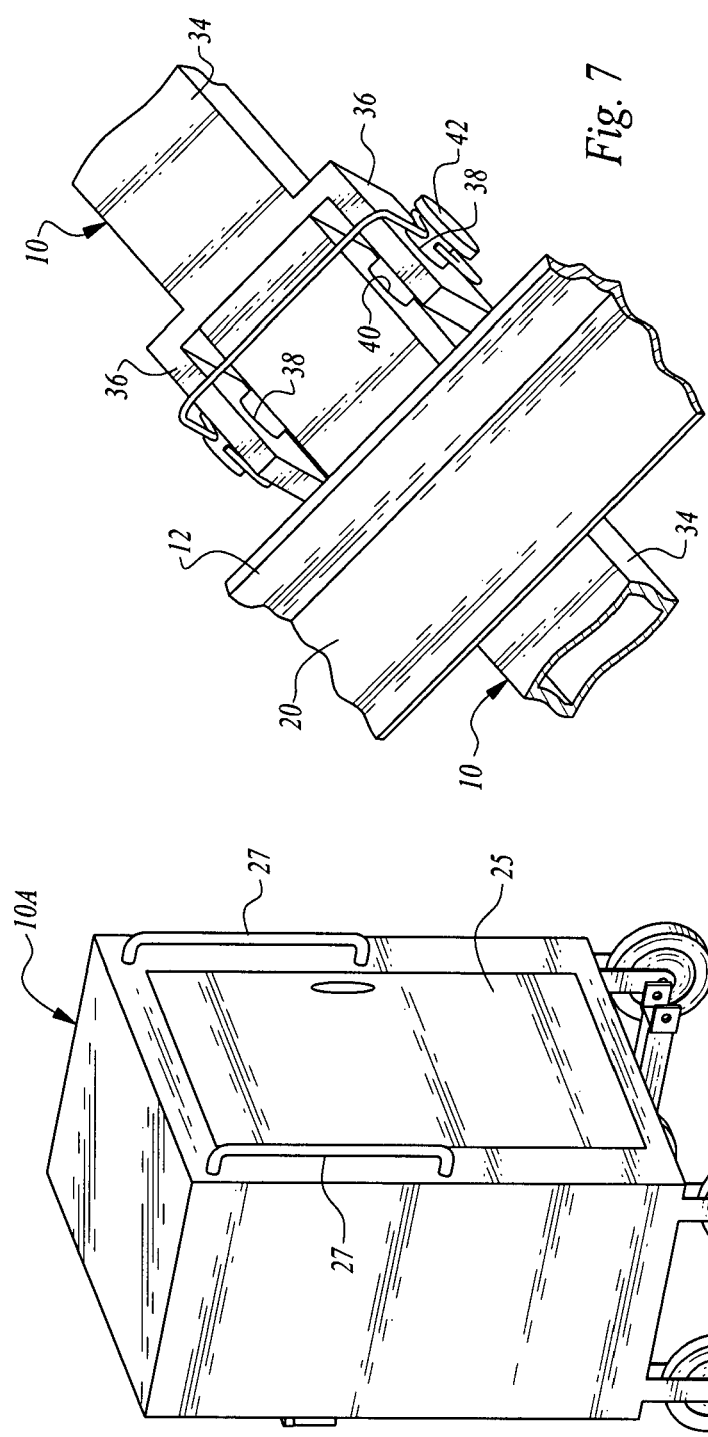
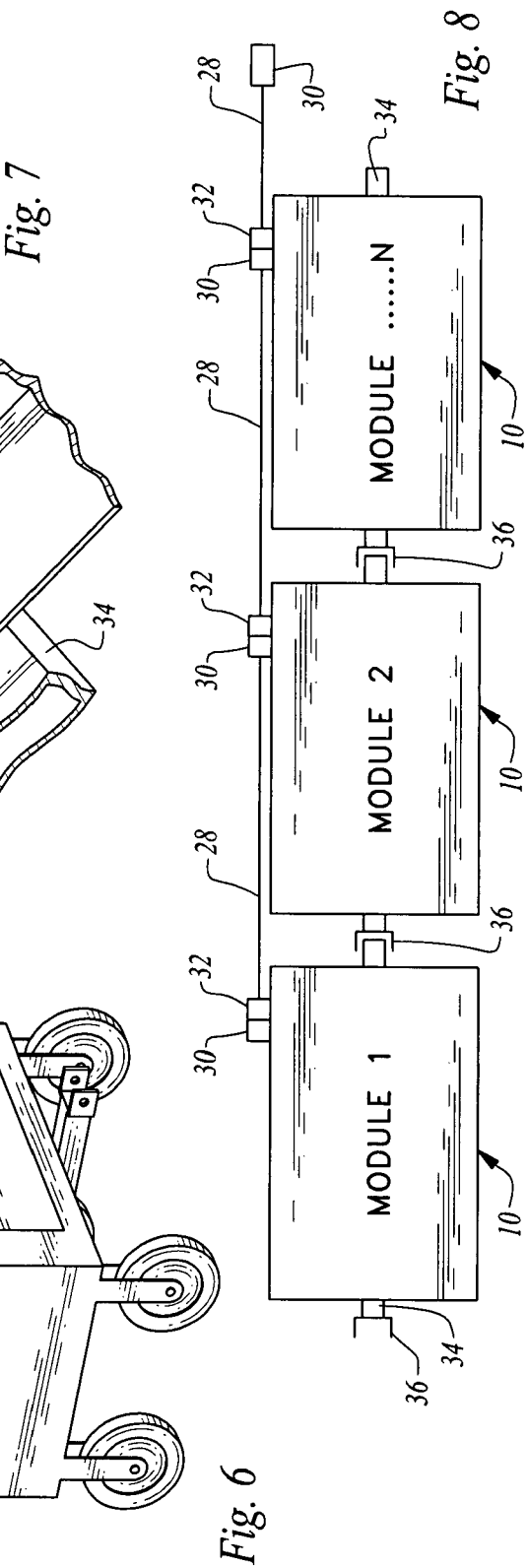
Fig. 6
Fig. 7
Fig. 8

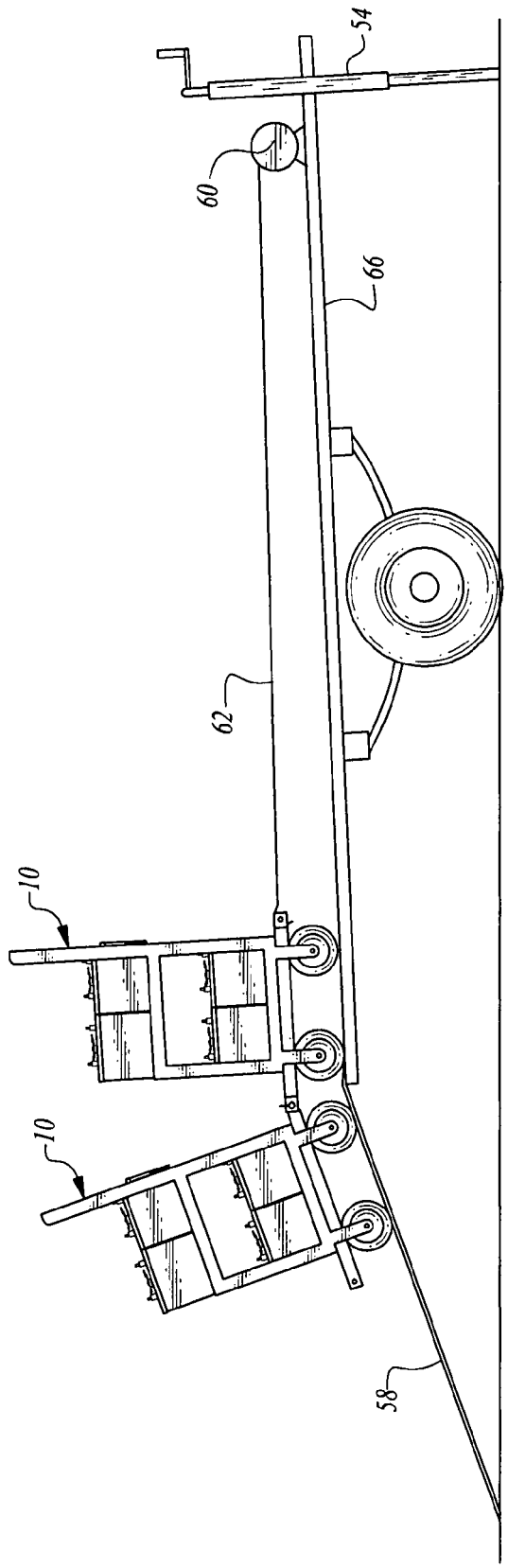
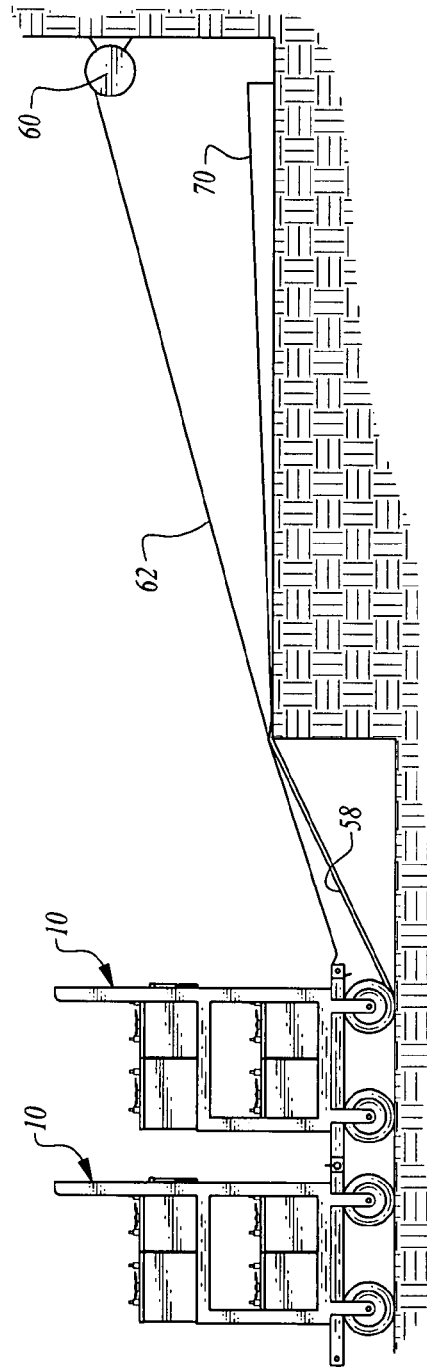
Fig. 9
Fig. 10

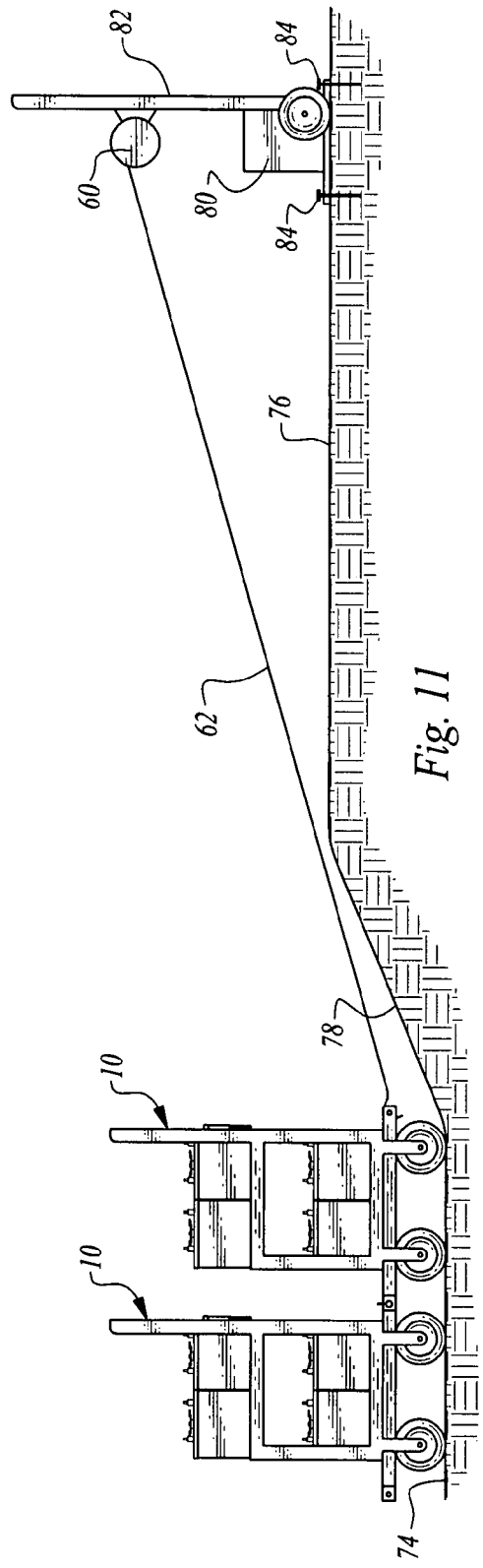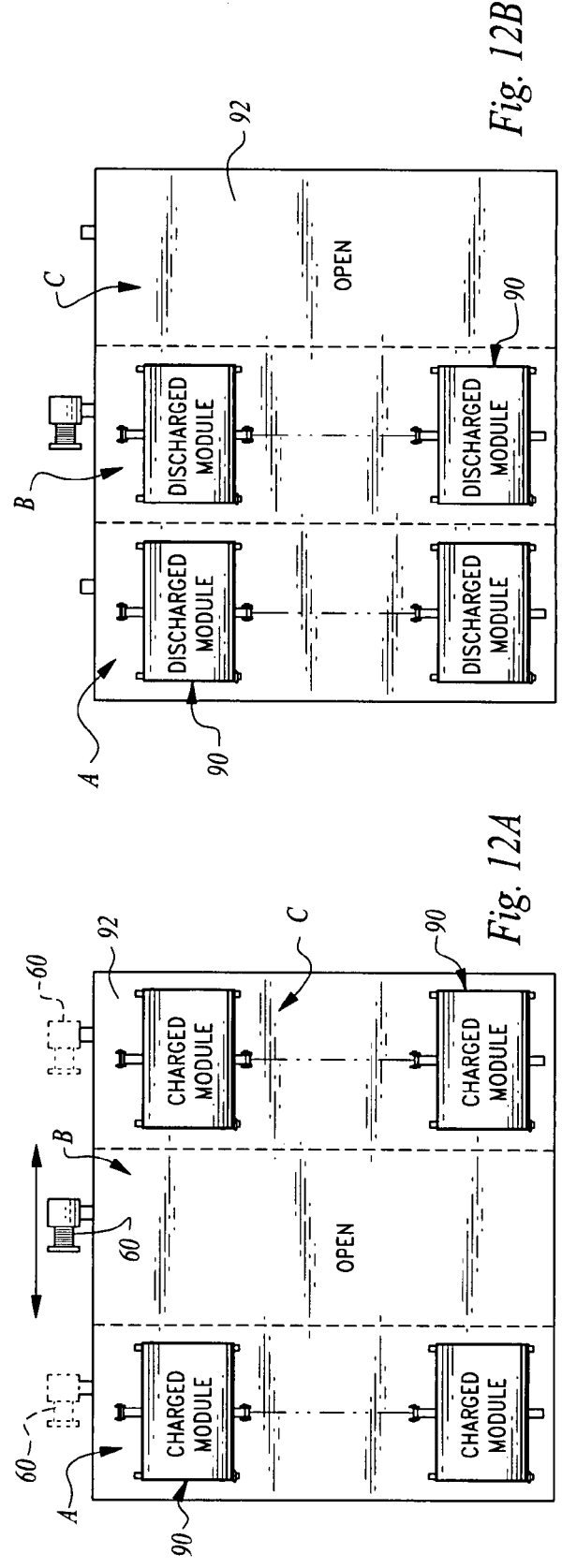
Fig. 11
Fig. 12A
Fig. 12B

REPLACEMENT SYSTEM FOR HEAVY BATTERY BANKS

TECHNICAL FIELD

This invention relates to a system for providing batteries to power electrically operated equipment at a site. The system encompasses both a method and apparatus.

BACKGROUND OF THE INVENTION

It is common to utilize small battery packs in electronic devices or small electrical appliances. Replacement of one small battery pack for another, for example one in which the batteries are depleted, is a common practice.

Replacement of heavy batteries, such as the common lead acid batteries employed in vehicles and in deep-cycle applications, is however far from a simple task, primarily because of the size and weight of the batteries. A single typical size lead acid battery weighs over 60 pounds. As a result, heavy battery packs (or battery banks) are currently designed to be recharged in situ, instead of being swapped or replaced by other heavy battery banks.

There are many situations in which heavy battery banks are employed; for example, in locations where regular line power is not available, such as remote locations, solar-powered, generator-powered, or wind-powered systems become necessary. Examples of such installations include remote communication sites and monitoring and surveillance stations. These types of systems have large battery banks containing multiple heavy batteries to supply power when the energy generating sources are not in operation. For example, a solar-powered system recharges its battery bank during daytime hours and stores the energy for use when the sun goes down. In rainy and cloudy seasons, when the solar panels cannot collect enough energy to charge the battery bank, a back-up generator is commonly used to actuate automatically to supplement power generation. With a large fuel tank for the generator, a battery bank in principle will remain charged almost indefinitely.

The above-described conventional approach has a number of drawbacks, including the following:

1. Small generators are extremely fuel inefficient. The cost per unit energy produced is among the highest of all power generation methods.

2. Small generators harm the environment in terms of both air and noise pollution.

3. These generators also have high maintenance requirements, requiring regular service.

4. The sizes of a generator and fuel tank typically are large, creating major challenges for applications where space is limited or when low visual profiles are desired.

5. Not only do the generator and fuel tank require extra cost for higher enclosure expense, the generator, the fuel tank, and the control electronics are quite costly. At certain geographic locations conditions may be such that the expensive back-up generator will sit idle for many months of the year, for example when a solar panel system provides enough electricity for the vast majority of the year, with generated power being required for just a couple of months.

6. Reliability is also an issue since back-up generators may not kick in when needed due to their many possible points of failure.

As will be seen below, the system of the present invention utilizes a plurality of manually maneuverable wheeled battery bank modules of a certain character to readily be transported to a site having electrically operated equipment and employed to replace depleted battery bank modules at the equipment, typically discharged modules.

While it is expected that the conventional existing approach described above will not go away, there are many situations where the system of the present invention is highly beneficial. In fact, this approach is deemed to be the only viable method where a generator and fuel tank are too costly or undesirable for some other reason. The method and apparatus of the present invention are suitable for many applications, including low power consumption applications which rely only on battery bank swapping, without the need for on-site power generation whatsoever. The system is workable in a wide variety of situations, particularly useful when transporting a large number of battery banks and for replacing battery banks at application sites where space is limited.

Battery carts per se, heavy battery replacement techniques, mobile battery trailers, and positioning carts on a truck are known. U.S. Pat. Nos. 2,626,972, 3,782,750, and 4,120,411 generally disclose battery moving carts or devices and unloading and loading batteries into them. These approaches are not practical or simply too costly to build. U.S. Pat. No. 5,077,513 depicts a portable battery cart as power source for jump-starting vehicles and includes a charging circuit as a complete stand-alone unit.

U.S. Pat. Nos. 6,357,070, 5,360,307, 1,566,089 and 3,122,244 disclose battery moving devices and or methods to load or unload a group of batteries through a framed structure on rollers. They are intended to handle only one group of batteries at a time.

U.S. Pat. No. 6,938,400 teaches the use of a battery trailer as a power source wherein the trailer is an auxiliary power source for mowing greens on a golf course. Patent Publication PCT WO 02/056440 teaches the use of a battery trailer with built-in traffic lights and solar panels to charge the batteries.

U.S. Pat. No. 6,149,370 discloses an automated latching and release system for handling a group of carts within a truck.

The above-identified patent publications do not teach or suggest the system disclosed and claimed herein.

DISCLOSURE OF INVENTION

The present invention includes a method of providing batteries to power electrically operated equipment at a site and the method includes positioning a first plurality of batteries on battery support structure of a manually maneuverable first wheeled cart to form a first battery bank module.

A second plurality of batteries is positioned on battery support structure of a manually maneuverable second wheeled cart to form a second battery bank module.

The first and second battery bank modules are brought into end-to-end relationship.

The first and second battery bank modules are releasably connected to maintain the end-to-end relationship therebetween and form a train of battery bank modules comprising at least the first and second battery bank modules. The train of battery bank modules is moved to the site. At the site the batteries of a selected number of the battery bank modules are placed into electrical communication with electrically operated equipment at the site.

The batteries of the selected number of battery bank modules in electrical communication with the electrically operated equipment at the site is employed to power the electrically operated equipment.

The system also relates to a manually transportable battery bank module selectively releasably connectable to one or more other battery bank modules for joint transport either to or from a site and for installation at the site to provide electrical power for electrically powered equipment at the site.

The battery bank module includes a manually maneuverable cart having front and rear cart ends and including battery support structure and a plurality of support wheels disposed under the battery support structure.

A plurality of electrically interconnected batteries forming a battery bank are disposed on the battery support structure.

The battery bank module also includes module connector structure at the front and rear cart ends for selectively releasably connecting the battery bank module to one or more adjacent battery bank modules to form a train of battery bank modules.

The battery bank module also includes electrical connector structure for selectively providing an electrical connection between the battery bank and battery banks of one or more adjacent battery bank modules or between the battery bank and electrically powered equipment.

Other features, advantages and objects of the present invention will become apparent with reference to the following description and accompanying drawings.

BRIEF DESCRIPTION OF DRAWINGS

FIG. 1 is a perspective view of a manually transportable battery bank module constructed in accordance with the teachings of the present invention;

FIG. 2 is a rear, perspective view of the battery bank module;

FIG. 3 is a perspective view showing two battery bank modules disposed end-to-end and forming a train of battery bank modules in the process of being pulled by a powered winch onto a ramp leading to a support surface;

FIG. 4 is a top, plan view of the arrangement shown in FIG. 3, with the positions of the battery bank modules after having been loaded on the support surface being indicated by dash lines;

FIG. 5 is a side, elevational view showing the two connected modules forming a train being pulled toward an inclined upper support surface of a trailer;

FIG. 6 is a perspective view of a second embodiment of battery bank module;

FIG. 7 is a greatly enlarged, perspective view showing connector structure of two modules releasably secured together by a lock pin;

FIG. 8 is a diagrammatic, plan view illustrating a plurality of battery bank modules positioned end-to-end to form a train, the modules connected by connector structure and electrical connectors employed to electrically connect the battery banks of the modules;

FIG. 9 is an elevational view showing a train comprised of two battery bank modules being pulled by a powered winch onto a transportation trailer incorporating a support jack utilized to change the inclination of the upper trailer surface;

FIG. 10 is an elevational view showing two connected battery bank modules adjacent to a ramp extending between two levels of a support surface and connected to a powered winch;

FIG. 11 is an elevational view showing a train of two battery bank modules adjacent to an inclined surface leading from one level to another and connected to a powered winch which is positioned on a hand cart disposed at the higher elevation and secured in place thereto; and FIGS. 12A and 12B are top, plan views of separate trains on a support bed of a trailer, truck, or other transportation vehicle and disposed side-by-side on the support bed, illustrating steps employed when replacing discharged modules with charged modules.

MODES FOR CARRYING OUT THE INVENTION

The system of this invention employs a manually transportable battery bank module to carry out the method of the invention. FIGS. 1 and 2 show an embodiment of the battery bank module, identified by reference numeral 10. The battery bank module is manually transportable and is selectively releasably connectable to one or more other battery bank modules for joint transport either to or from a site and for installation at the site to provide electrical power for electrically powered equipment at the site.

The battery bank module 10 includes a manually maneuverable cart 12 in the form of a rigid frame having front and rear cart ends 14, 16 respectively.

The cart also includes battery support structure in the form of platforms 18, 20 supporting a plurality of batteries 22, in this instance a total of eight batteries. The combined weight of the cart and the batteries should not exceed the weight of what an average person can handle. For example, eight common lead acid batteries, together with the cart, should not exceed about 600 pounds. The batteries 22 are all electrically interconnected to form a battery bank disposed on the cart.

Four support wheels 24 are disposed under the frame and they may for example be all terrain, flat-free wheels, suitable for the intended path of travel. An example would be 10 inch or larger diameter, polyurethane filled rubber tires. These wheels can be attached to the frame by simple immovable axles, as shown, or with swivel mechanism. The open frame type module 10 is suitable for use if the battery banks are housed in a protective enclosure at the site of use. For applications without enclosures for the battery banks, a module such as module 10A shown in FIG. 6, a box module with the batteries fully enclosed and having one or more access doors 25, is preferably employed.

Wheels 24 of the module 10 (or 10A) are disposed below the platform 20 to keep the module compact in nature. The rigid frame of the cart has a manually graspable portion or handle 26 for manually maneuvering the battery bank module. In FIG. 6, the module 10A has handles 27. To facilitate loading the module up or down steep ramps or slopes, the wheels 24 should be positioned close to the front and rear edges of the frame and may slightly exceed both edges, if desired.

Each module 10 has electrical connector structure for selectively providing an electrical connection between the battery bank and battery banks of one or more adjacent battery bank modules or between the battery bank and electrically powered equipment. In particular, the module has a very low resistance electrical cable 28 electrically connected to the battery bank comprised of the batteries 22 and a plug 30 for connecting all the batteries within the module to the destination electrical system. This cable and plug will also be used for connecting to a recharging station (not shown) to restore the battery bank's energy after the modules are retrieved from the field or site of use. The plug 30 is operatively associated with a socket 32 which accepts a plug and cable from another module to create a bigger battery bank. This is shown schematically in FIG. 8. Each battery bank of the system may have as little as only one module, or as many modules as required by simply linking the modules together. See FIG. 8.

Module connector structure is located at the front and rear cart ends for selectively releasably connecting the battery bank module to one or more adjacent battery bank modules to form a train of battery bank modules. In the arrangement illustrated, the connector structure includes a square tube 34 welded at the bottom of the frame, running front to rear and projecting beyond the front and rear of the cart frame. Bracket plates 36 (see FIG. 7) defining aligned apertures extend from the front end of square tube 34. These apertures are identified by reference numeral 38 and align with apertures 40 defined by the rear end of the tube 34 associated with the adjacent following module 10. A quick release lock pin 42 passes through aligned apertures 38, 40 to releasably maintain a connection between the adjacent modules 10. Any other suitable hitch mechanism, such as a conventional ball hitch, may be utilized for this purpose. The two interconnected battery bank modules form a train. Additional modules can be connected front or rear to create a longer train in the same manner. FIG. 8 demonstrates this principle.

As a preferred implementation, freshly charged battery bank modules 10 can be loaded onto a vehicle such as a transportation trailer or truck bed by means of a loading dock having the same height so that the heavy modules can be loaded onto the waiting vehicle with minimum effort. Having the loading dock at the same height as the vehicle bed also facilitates unloading of the discharged modules. However, this is not the only suitable approach. As described below, aspects of the present invention make loading and unloading of the heavy modules essentially effortless in many situations. As indicated above, if the receiving site, the site where the modules are utilized, has a loading dock and if a vehicle bed height is substantially the same as the height of placement of the modules, the fresh modules can be unloaded and the discharged modules can be loaded back to the vehicle without a problem, as discussed above. Any significant height difference between the loading dock and the vehicle bed will normally make either the loading or unloading more difficult, since the heavy modules have to go "up hill", once. In addition, when direct off-loading is not possible at the receiving site, which may be a common occurrence, one must deal with the problem of moving the fresh modules down the transporting vehicle bed, maneuvering and uploading them to the site, and then reverse the path of travel back to the vehicle bed with the discharged modules.

Although each module by design is a power source and a self-propulsion mechanism could be added to the module for easy maneuvering, it is not cost effective or efficient to do so. According to the teachings of the present invention, just employing an off the shelf electric powered winch can make the loading and unloading of the heavy modules a quick and effortless procedure.

FIG. 3 shows a train consisting of two modules 10 positioned below the level of a trailer 50 having a support bed 52. FIGS. 4 and 5 respectively show this arrangement in plan and side elevational views. In this instance the trailer is an equipment trailer at the site where the modules are to be installed and connected to electrically powered equipment on the trailer. The trailer and equipment may be, for example, the mobile surveillance equipment disclosed in my U.S. patent application Ser. No. 10/764,724, filed Jan. 26, 2004. The electrically powered equipment is shown in schematic form in dash lines in these Figures and designated by reference number 98.

The trailer 50 has a support bed 52 in the form of an inclined wedge-shaped ramp positioned on the normally horizontal lower support bed 56 thereof. An extension ramp in the form of two parallel ramp members 58 extends downwardly from the lower support bed 56.

An electrically powered winch 60 is installed on the bed 56. A cable 62 extends from the winch about sheaves 64, the distal end of the cable being attached to the foremost module 10, in this instance the lock pin 42 associated with the tube 34 thereof. With the simple push of a control button (not shown) the winch is actuated and all of the modules 10 are loaded onto the trailer in one pass, without effort. To unload the modules, the force of gravity is employed, the inclined ramp support bed 52 directing the modules back toward the extension ramp and the ground. The winch, sheave and cable arrangement exerts a restraining force on the train to control movement thereof under the influence of gravity while unloading.

FIG. 9 illustrates a trailer 66 which is for the purpose of transporting modules to sites where charged modules are used to replace existing modules, for example discharged modules. These sites may be where installations of electrically operated equipment are of a permanent or temporary nature, the latter being exemplified by the mobile surveillance equipment described above. A jack 54 is utilized to incline the normally horizontal support surface of the trailer in the unloading direction whereby the force of gravity will cause movement of the train of modules to the left as shown in FIG. 9. A winch 60 at the front end of the trailer is connected by a cable 62 to the train of modules to both load and unload the train. During unloading, the winch and cable are connected to the normally leading, but now trailing, module 10 to exert a restraining force on the train to control movement of the train on the inclined upper surface under the influence of gravity.

FIG. 10 shows a train comprised of two modules 10 located at the lower end of a ramp member 58 which extends between two levels of a support surface at a site of electrically powered equipment (not shown). The upper level of the support surface has an inclined upper surface 70. A powered winch 60 and cable 62 are utilized to pull the train of modules up ramp member or members 58 and onto inclined upper surface 70. The winch and cable can also be utilized, as described above, to act as a restraining force to control movement of the modules back to the lower level under the influence of gravity during unloading.

FIG. 11 illustrates another environment which the train of modules can encounter during movement. In this instance, the ground or other support surface along the train path includes a lower level 74, an upper level 76 at a site of electrically powered equipment (not shown) and an integral inclined portion 78 extending therebetween. Here too, a winch 60 and cable 62 are connected to the train and exert a pulling force to move it up the incline 78 from lower level to upper level. What is unique in this situation is the fact that the winch 60, which may be powered by a battery 80, is mounted on a hand cart 82, the hand cart being held in place on upper level 76 by any suitable expedient such as stakes 84 pounded into the ground. It will be appreciated that the hand cart may be readily disconnected and moved to another location of use when desired.

FIGS. 12A and 12B illustrate a situation wherein two separate trains 90 have been loaded onto a trailer support bed 92 and are disposed side-by-side thereon. These two trains are disposed in two segments or columns identified as column A and column C. Middle column B is empty.

In order to make the battery bank replacement system work smoothly, the transportation trailer or other transportation vehicle needs to be configured to facilitate efficient unloading of fresh battery modules and loading of the discharged modules back onto the transportation trailer.

Since the battery modules are heavy, the limiting load factor on the trailer deck is not the area, but the gross allowable vehicle weight.

In the transportation trailer shown in FIGS. 12A and 12B, three trains or lines of battery modules could easily be accommodated. A newly fully loaded transportation trailer will have two columns of freshly charged battery modules. These two columns will typically be transported by the transportation trailer to the site of use from a charging station located elsewhere. For illustration purposes, columns A and C will accommodate freshly charged battery modules as shown in FIG. 12A. One of the three columns or sections of the trailer shall be left vacant for receiving the discharged modules, column B in this example.

At the beginning of a module swapping operation at the site of module use, the fresh modules in column A will be used up first and the discharged modules they replace will be loaded onto column B. When column A is fully emptied, column B will be filled with an equal number of discharged modules.

The swapping process then continues into column C. The discharged or replaced modules 10 will now be loaded up into column A which has been emptied. When column C is emptied, the column A will be loaded with an equal number of discharged modules. At the end of the swapping process, columns A and B will be filled with discharged modules for return to the recharging facility. This is shown in FIG. 12B. A transversely adjustable powered winch 60 may be utilized with a cable to serve the three columns.

This replacement operation is very efficient. Preferably, each column will have at least one divider or track mounted on the support bed or trailer deck. These tracks can also be designed for easy removal, by using quick releases such as "key hole" slots or "drop pins" so that the trailer can be reconfigured to carry other types of pay loads. Any suitable approach may be utilized to tie down the modules on the vehicle support beds.

The invention claimed is:

1. A method of providing batteries to power electrically operated equipment at a site, said method comprising the steps of:
   positioning a first plurality of batteries on battery support structure of a manually maneuverable first wheeled cart to form a first battery bank module;
   positioning a second plurality of batteries on battery support structure of a manually maneuverable second wheeled cart to form a second battery bank module;
   bringing said first and second battery bank modules into end to end relationship;
   releasably connecting said first and second battery bank modules to maintain the end to end relationship therebetween and form a train of battery bank modules comprising at least said first and second battery bank modules;
   moving said train of battery bank modules to said site;
   at said site, placing the batteries of a selected number of the battery bank modules into electrical communication with electrically operated equipment at said site; and
   employing the batteries of said selected number of battery bank modules in electrical communication with electrically operated equipment at said site to power said electrically operated equipment.

2. The method of claim 1 including the steps of electrically connecting the batteries of said first battery bank module to the batteries of said second battery bank module and placing the electrically connected batteries of both said first and second battery bank modules into simultaneous electrical communication with said electrically powered equipment.

3. The method of claim 1 wherein electrically powered equipment is positioned at a plurality of locations at said site, said method including, after the step of moving said train to said site, the step of separating battery bank modules in said train and distributing said separated battery bank modules among different locations at said site to power electrically powered equipment at said different locations.

4. The method according to claim 1 including the step of providing each of said battery bank modules in said train with at least two electrical connectors and utilizing said electrical connectors to either electrically connect the batteries of adjacent battery bank modules or to electrically connect the batteries of one or more of said battery bank modules to said electrically powered equipment.

5. The method according to claim 1 wherein the step of moving said train of battery bank modules to said site is at least partially carried out by employing a vehicle to move the train at least part way to the site.

6. The method according to claim 1 wherein the battery bank modules in said train are employed to replace other battery bank modules already at said site, the method including the step of disconnecting the battery bank modules already at said site from the electrically powered equipment at said site prior to placing the batteries of battery bank modules in said train into electrical communication with said electrically powered equipment.

7. The method according to claim 6 including the additional steps of assembling the replaced battery bank modules into a second train and moving said second train away from said site.

8. The method according to claim 5 wherein said vehicle has a support bed, said method including the steps of loading said train of battery bank vehicles on to said support bed, carrying said train on said support bed to said site, and unloading said train from said support bed at said site.

9. The method according to claim 8 wherein said loading step is carried out by connecting a powered winch to said train and employing said powered winch to pull said train on to said support bed.

10. The method according to claim 8 wherein said train is loaded on to said support bed with other trains, said trains consecutively pulled onto said support bed.

11. The method according to claim 10 wherein said trains after being loaded are disposed side-by-side on said support bed, said method including sequentially replacing said trains with trains of discharged modules at said site.

12. The method according to claim 8 wherein a powered winch is connected to said train and employed to pull said train to unload said train from said support bed at said site.

13. The method according to claim 1 wherein the step of moving said train of battery bank modules to said site is partially accomplished by connecting the train to a powered winch and employing said powered winch to move said train.

14. The method according to claim 8 wherein said support bed has an inclined upper surface, said unloading step including utilizing gravity to unload said train from said inclined upper surface.

15. The method according to claim 14 including the step of exerting a restraining force on said train to control movement of said train on said inclined upper surface under the influence of gravity.

16. The method according to claim 15 wherein a powered winch is connected to said train and employed to exert said restraining force.

17. The method according to claim 14 including the step of adjusting the angle of inclination of said inclined upper surface.

18. The method according to claim 1 wherein the step of moving said train of battery bank modules to said site is at least partially carried out by utilizing a winch to pull the train at least part way to the site.

19. A manually transportable battery bank module selectively releasably connectable to one or more other battery bank modules for joint transport either to or from a site and for installation at said site to provide electrical power for electrically powered equipment at said site, said battery bank module comprising, in combination:

a manually maneuverable cart having front and rear cart ends and including battery support structure and a plurality of support wheels disposed under said battery support structure;

a plurality of electrically interconnected batteries forming a battery bank disposed on said battery support structure;

module connector structure at the front and rear cart ends for selectively releasably connecting said battery bank module to one or more adjacent battery bank modules to form a train of battery bank modules; and electrical connector structure for selectively providing an electrical connection between said battery bank and battery banks of said one or more adjacent battery bank modules or between said battery bank and said electrically powered equipment, said battery support structure comprising a plurality of platforms disposed at different elevations above said support wheels, each platform supporting a plurality of batteries.

20. The manually transportable battery bank module according to claim 19 wherein said cart includes a rigid frame attached to said plurality of platforms and having a manually graspable portion for manually maneuvering said battery bank module.

* * * * *